United States Patent [19]

Price et al.

[11] 4,030,007
[45] June 14, 1977

[54] DIRECT CURRENT BRAKING MEANS FOR WOUND ROTOR MOTOR

[75] Inventors: Lester A. Price, Greenfield; James N. Nash, New Berlin, both of Wis.

[73] Assignee: Harnischfeger Corporation, West Milwaukee, Wis.

[22] Filed: Aug. 25, 1975

[21] Appl. No.: 607,601

[52] U.S. Cl. .......................... 318/203 R; 318/212; 318/227
[51] Int. Cl.[2] ........................................ H02P 3/20
[58] Field of Search ........... 318/203 R, 203 A, 204, 318/211, 212, 227

[56] References Cited

UNITED STATES PATENTS

| | | | |
|---|---|---|---|
| 3,514,682 | 5/1970 | Corey | 318/212 |
| 3,546,550 | 12/1970 | Badal et al. | 318/212 |
| 3,699,416 | 10/1972 | Sloan et al. | 318/211 |
| 3,866,097 | 2/1975 | Anzai et al. | 318/212 |
| 3,876,918 | 4/1975 | Komuro et al. | 318/203 R |
| 3,973,175 | 8/1976 | Anzai et al. | 318/203 R |

*Primary Examiner*—Gene Z. Rubinson
*Attorney, Agent, or Firm*—James E. Nilles

[57] ABSTRACT

A hoist uses an alternating current three-phase variable speed reversible wound rotor motor to hoist and lower a load. An electromechanical brake and a tachometer generator are connected to the motor shaft. Controllable SCRs connected to the motor stator (primary) windings control motor direction and speed and motor braking in response to error signals resulting from comparison of reference signals from an operator's master control and feedback signals from the tachometer. During hoisting and lowering (when the electromechanical brake is released), direct current voltage derived from appropriate gating of the controllable SCRs is applied to the motor stator (primary) winding to effect direct current braking as required. This direct current flow is smoothed and rendered more effective by gating "on" a free-wheeling SCR which is connected across two of the motor stator (primary) windings. Emergency dynamic braking means operative in the event of failure of the electromechanical brake while the motor and control are deenergized but supporting a suspended load applies a rectified feedback signal from the tachometer to produce a magnetic field in the motor stator (primary) windings. A bridge rectifier is connected between the motor rotor (secondary) and stator (primary) windings. It produces a direct current voltage from the induced alternating current voltage in the rotor (secondary) which in turn provides additional direct current excitation to he stator to achieve emergency braking and slow descent of the load.

19 Claims, 6 Drawing Figures

DIRECT CURRENT BRAKING MEANS FOR WOUND ROTOR MOTOR

BACKGROUND OF THE INVENTION

1. Field of Use

This invention relates to direct current brake means for alternating current variable speed reversible wound rotor motors, such as are used on hoists, cranes, rolling mills or the like.

2. Description of the Prior Art

In certain industrial equipment, such as cranes, hoists, steel rolling mills and the like, it is advantageous to use variable speed, reversible electric motors capable of handling heavy, and sometimes overhauling, loads.

Such motors when applied to hoists, for example, are provided with control means, including controllable SCRs, which enable motor operation in the powering mode (both for hoisting and lowering), in the regenerative mode (during lowering only), and in the braking mode (during both hoisting and lowering). In the powering mode (wherein speed and torque are in the same direction), direction of motor rotation is determined by control of the phase sequence of the alternating current voltage applied to the motor stator (primary) windings by the SCRs and slip speed (or torque) is controlled by regulating the magnitude of the applied stator voltage.

In the regenerative mode (wherein speed and torque are in opposite directions and the motor functions as an induction generator with negative slip), the direction of motor rotation is determined by the load, and torque and speed are determined by inherent motor characteristics.

In the braking mode, it is known that braking can be accomplished by conventional counter-torque techniques or by the applying direct current from an outside source to the stator (primary) winding of the wound rotor motor and the prior art contains several patents which disclose completely separate and independent direct current sources used for this purpose, such as, U.S. Pat. Nos. 3,166,701; 3,302,086; 3,281,633; and 3,313,992, for example.

SUMMARY OF THE INVENTION

In accordance with the invention there is provided a control means or system for a hoist having an alternating current three-phase variable speed reversible wound motor to hoist and lower a load. An electromechanical brake and a tachometer generator are connected to the motor shaft.

The control means for the motor enable motor operation in the powering mode (hoisting and lowering), in the regenerative mode (during lowering only) and in the brake mode (during hoisting or lowering). Controllable SCRs connected to the motor stator (primary) windings control motor direction and speed and motor braking in response to error signals resulting from comparison of reference signals from an operator's master control and feedback signals from the tachometer. In the powering mode (wherein speed and torque are in the same direction) direction of motor rotation is determined by the phase sequence of the alternating current voltage applied to the motor stator (primary) windings through the controllable SCRs and slip speed (or torque) is controlled by the SCRs by regulating the applied stator voltage. In the regenerative mode (wherein speed and torque are in opposite directions and the motor functions as an induction generator with negative slip), the direction of motor rotation is determined by the load and torque and speed are determined by inherent motor characteristics. During hoisting and lowering (when the electromechanical brake is released), when the braking mode is required, direct current voltage derived from the appropriate gating of the controllable SCRs is applied to two of the motor stator (primary) windings to effect direct current braking as required. This ddirect current flow is smoothed and rendered more effective by gating "on" a freewheeling SCR which is connected across the two motor stator (primary) windings used. In the braking mode, speed and torque are also in opposite directions.

The control means further comprise emergency dynamic braking means operative in the event of failure of the electromechanical brake (caused by brake-lining wear, for example) while the motor and control are deenergized (caused by power outage or open safety switch, for example) but supporting a suspended load. A rectified feedback signal from the tachometer induces a magnetic field in the motor stator (primary) windings. A bridge rectifier is connected between the motor rotor (secondary) and stator (primary) windings. It produces a direct current voltage from the induced alternating current voltage in the rotor (secondary) which in turn provides additional direct current excitation to the stator to achieve dynamic braking and a slow descent of the load.

A motor control system having direct current braking in accordance with the invention employs static or solid state reversal elements and has excellent duty cycle performance with a good torque per ampere ratio when braking. The braking portion of the cortrol system could enable 200 or 300 percent light load speeds with excellent speed regulation.

Other objects and advantages will hereinafter appear.

DESCRIPTION OF PREFERRED EMBODIMENTS

Figure 1:
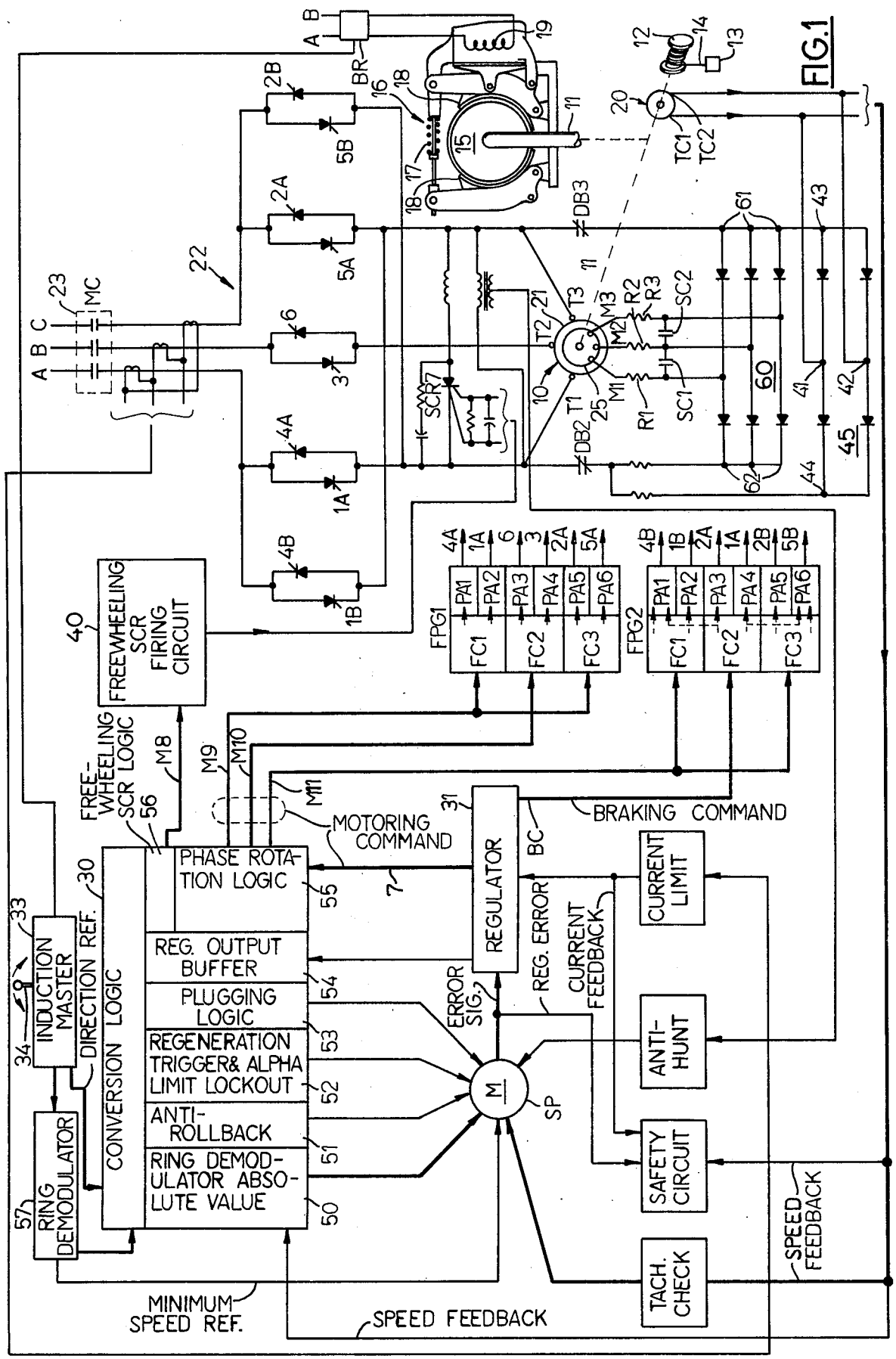
FIG. 1 is a schematic diagram of a control system including direct current braking means in accordance with the present invention.
Figure 2:
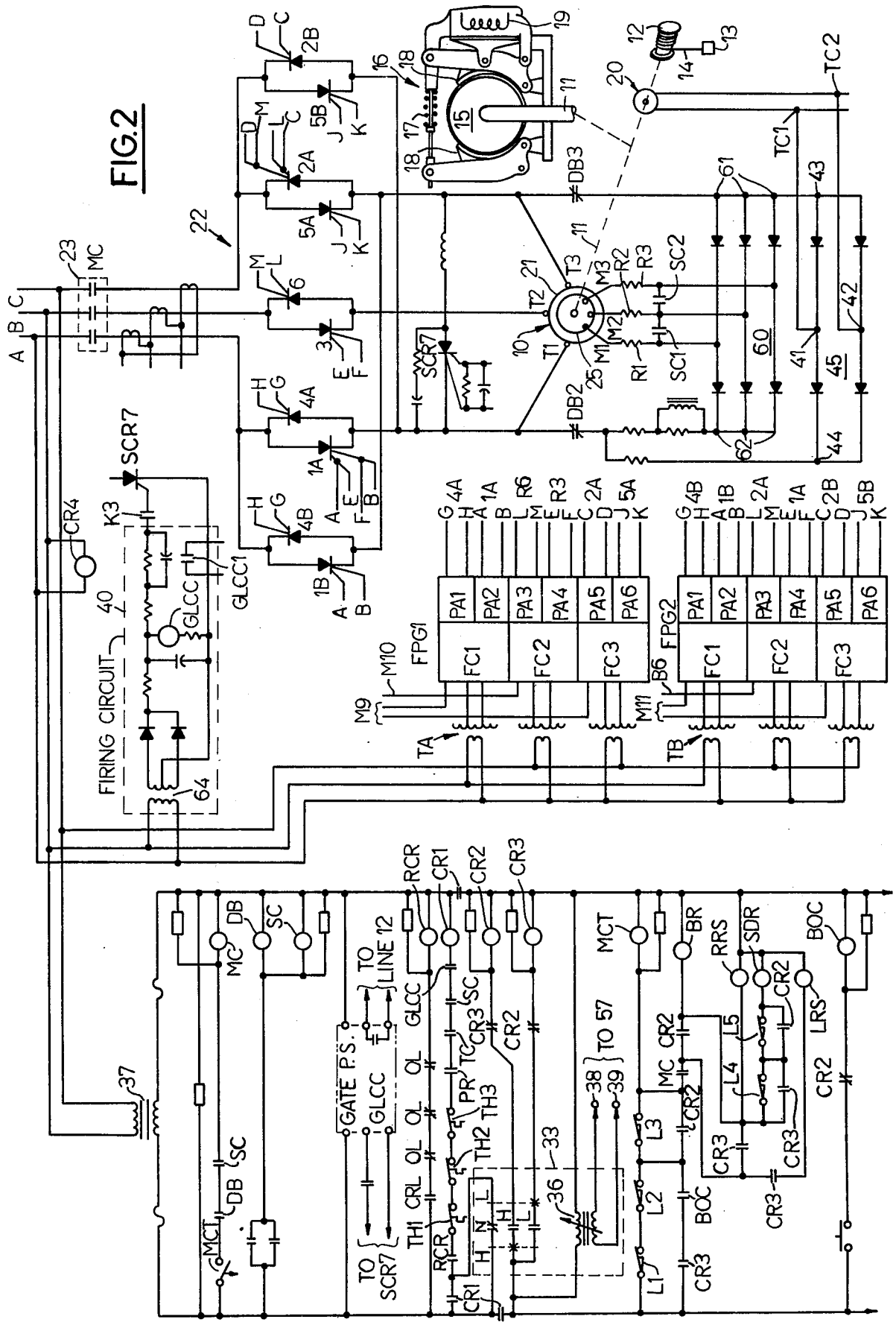
FIG. 2 is another schematic diagram of the system shown in FIG. 1 but showing certain portions of the circuit in detail.

Referring to FIGS. 1 and 2, the numeral 10 designates an alternating current three-phase variable speed reversible would rotor motor having a shaft 11 which drives a hoist drum 12 to raise or lower a load 13 suspended from a cable 14 on the drum. Shaft 11 is connected to a brake wheel 15 of an electromechanical brake 16 having brake shoes 18 which, when the brake is deenergized, are noramlly urged by spring means 17 against the brake wheel to prevent motor and hoist drum rotation when the motor is deenergized. Brake 16 also comprises a brake coil 19 energizable, for example, from a power source including lines A and B hereinafter described in response to operations of a conventional brake relay coil BR to release the brake. It is to be understood that when lines A and B are disconnected from brake coil 19 or when lines A and B are deenergized, as by a power failure, the brake shoes 18 normally act to prevent rotation of brake wheel 15, shaft 11, motor 10, hoist drum 12, and a tachometer generator 20. It is to be further understood that brake coil 19 is normally deenergized to apply the electromechanical brake 16 whenever motor 10 is deenergized, either in response to operation of an induction master control 33, or in response to a power failure. It is to be further understood that brake 16 is subject to various types of failure resulting, for example, from brake shoe wear or mechanical damage, which would allow rotation of shaft 11 and rotatable components connected thereto if such failure occurred while a load 13 is suspended from line 14 on hoist drum 12.

Shaft 11 is also connected to drive a direct current tachometer generator 20 which provides a direct current output signal proportional to motor speed at its terminals TC1 and TC2 whenever shaft 11 rotates in either direction. The tachometer output signal is usable as a motor speed feedback signal for motor control and also, when rectified (to provide constant polarity), to initiate direct current flow in motor 10 for emergency braking.

Motor 10 comprises a three-phase stator (primary) winding 21 having terminals T1, T2, T3 connectable through a thyristor bank 22 and through the contacts MC of a contactor 23 to a source of three-phase alternating current power comprising power supply terminals or phase lines A, B, C. Motor 10 also comprises a three-phase rotor (secondary) winding 25 having terminals M1, M2, M3 which are connected to rotor resistors R1, R2, R3.

A control system is provided for motor 10 to enable powering operation at desired speeds in the hoist (forward) and lower (reverse) directions. In accordance with one aspect of the invention, the control system including controllable braking means to enable direct current braking of motor 10 while the motor is being operated in either direction. In accordance with another aspect of the invention, the control system further includes emergency braking means to enable direct current braking of motor 10 in the event of a mechanical failure of electromechanical brake 16 while the motor and control are deenergized with a load 13 suspended from hoist drum 12.

Figure 5:
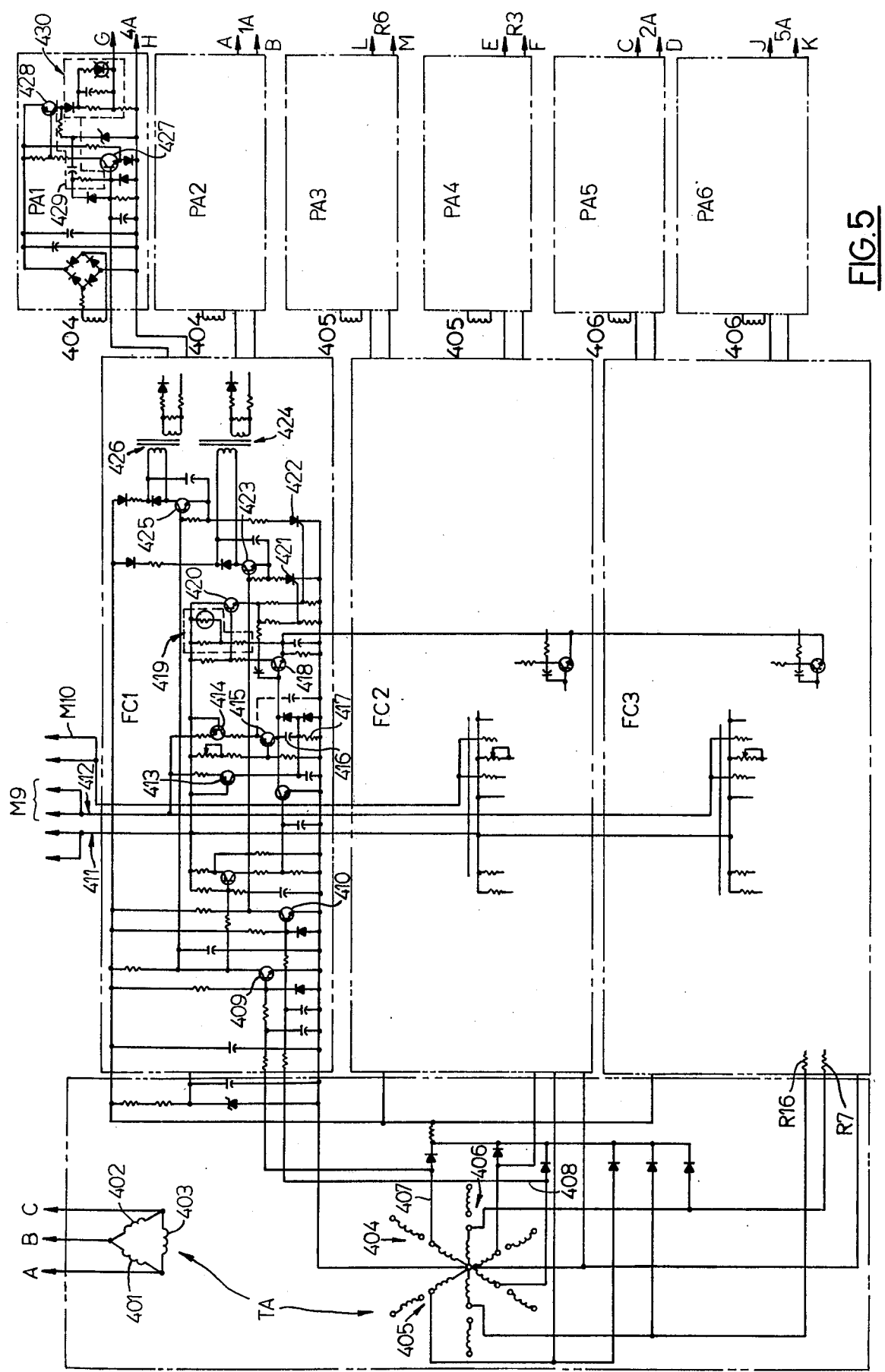
FIGS. 5 and 6 are circuit diagrams of the two firing pulse generators shown schematically in FIGS. 1 and 2.
Figure 6:
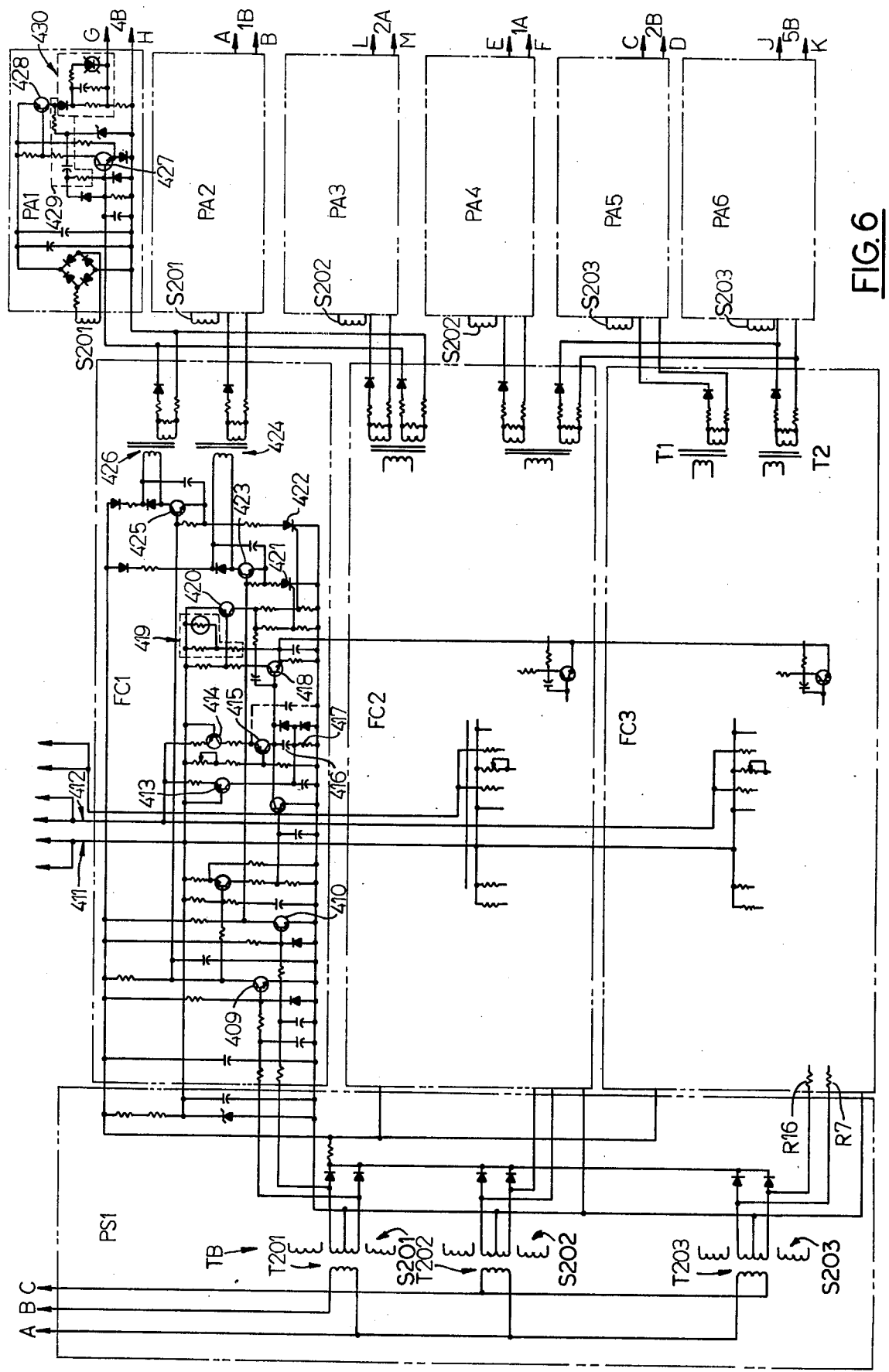

Thyristor bank 22 includes ten SCRs (silicon controlled rectifiers) positioned as shown in FIGS. 1 and 2 and designated 1B, 4B, 1A, 4A, 3, 6, 5A, 2A, 5B, 2B) which are controlled by firing pulse generators designated FPG1 and FPG2. Direction of the motor rotation is determined by the firing order (phase sequence) of the SCRs in bank 22. Motor speed (torque and, thus, slip speed) is controlled by the proper timing of gating of the SCRs in bank 22 to regulate the applied stator voltage. The firing pulse generators FPG1 and FPG2 are energized by and receive phase synchronization signal information from transformers TA and TB, respectively, which are energized from the phase lines A, B, C, as FIGS. 2, 5 and 6 show. The firing pulse generators (which are similar in construction and operation except as hereinafter noted) each comprise three firing circuits (all of similar construction) designated FC1, FC2, FC3 and six pulse amplifiers (all of similar construction) designated PA1 through PA6. The firing pulse generators FPG1 and FPG2 receive motoring command signals from a conversion logic circuit 30 through lines M9, M10 and M11. Firing circuit FC2 of firing pulse generator FPG2 receives braking command signals through a line BC from a regulator circuit 31. The motoring and braking command signals are d.c. signals (always positive) but varying in voltage level.

Figure 4:
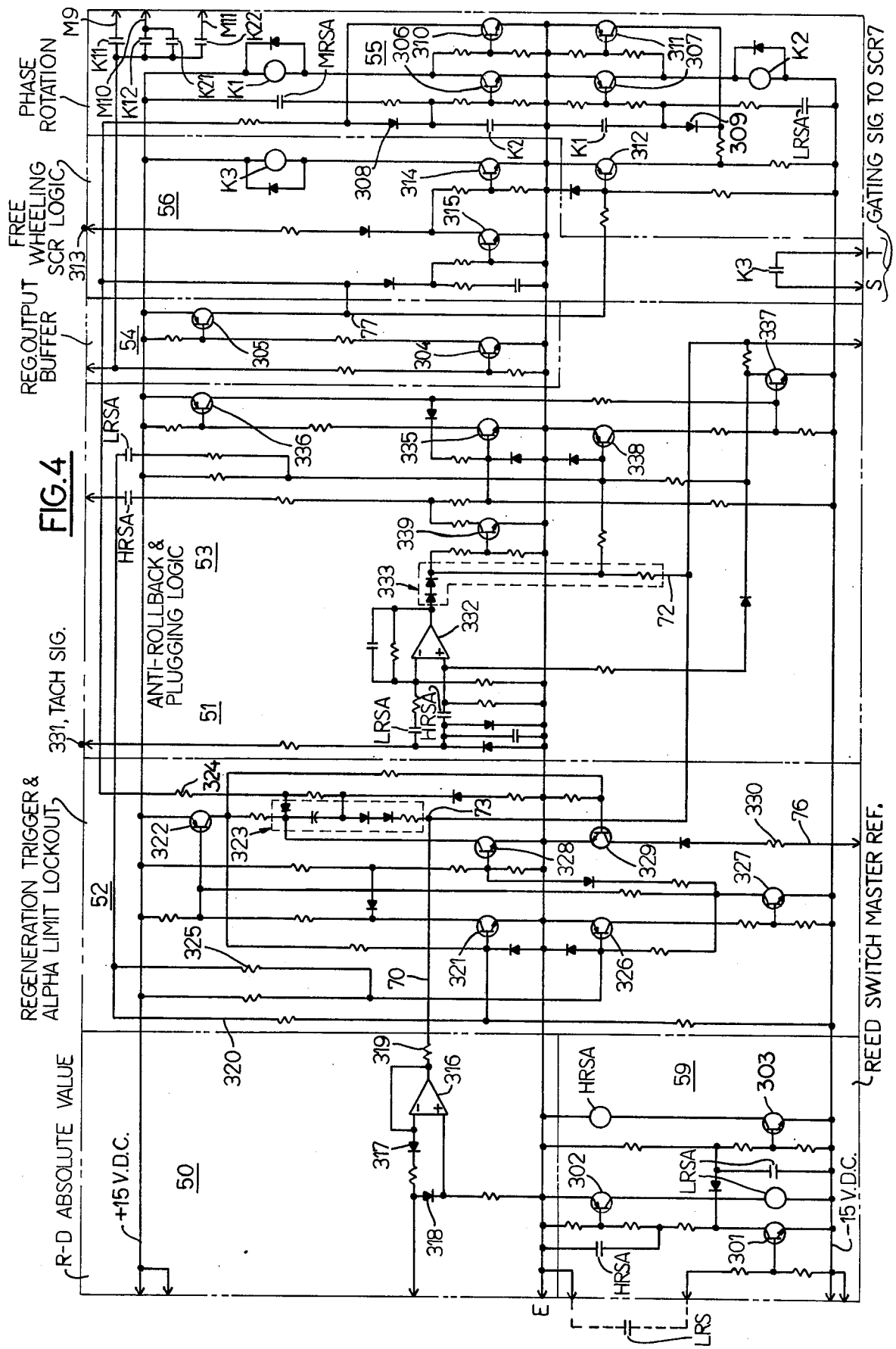
FIG. 4 is a circuit diagram of a conversion logic circuit shown schematically in FIG. 1.

The conversion logic circuit 30, shown in FIGS. 1 and 4, receives speed reference signals (via the ring demodulator) and rotation direction reference signals from an induction master control 33. Conversion logic circuit 30, in turn, provides a speed reference signal to a summing point SP at the input stage of regulator circuit 31. Tachometer 20 provides a speed feedback signal from motor 10 to summing point SP. The error signal resulting from comparison of the speed reference signal and speed feedback signal drives the regulator circuit 31 and the latter then produces motoring or braking commands.

In accordance with one aspect of the invention, where direct current braking is provided for, a controlled rectifier SCR7 is connected across phase lines A and C, i.e., between the terminals T1 and T3 of stator (primary) winding 21 of motor 10, to serve as a freewheeling diode when gated "on" by firing circuit 40. Firing circuit 40 provides for gating SCR7 "on" and "off" and operates in response to the closing of reed relay K3 on the conversion logic circuit 30 when direct current braking is required (command signal on line M8). As FIG. 2 shows, firing circuit 40 is energized from a transformer 64 connected across phase lines A and B of the system power source. Firing circuit 40 comprises a N/O relay GLCC for safety check purposes.

Figure 3:
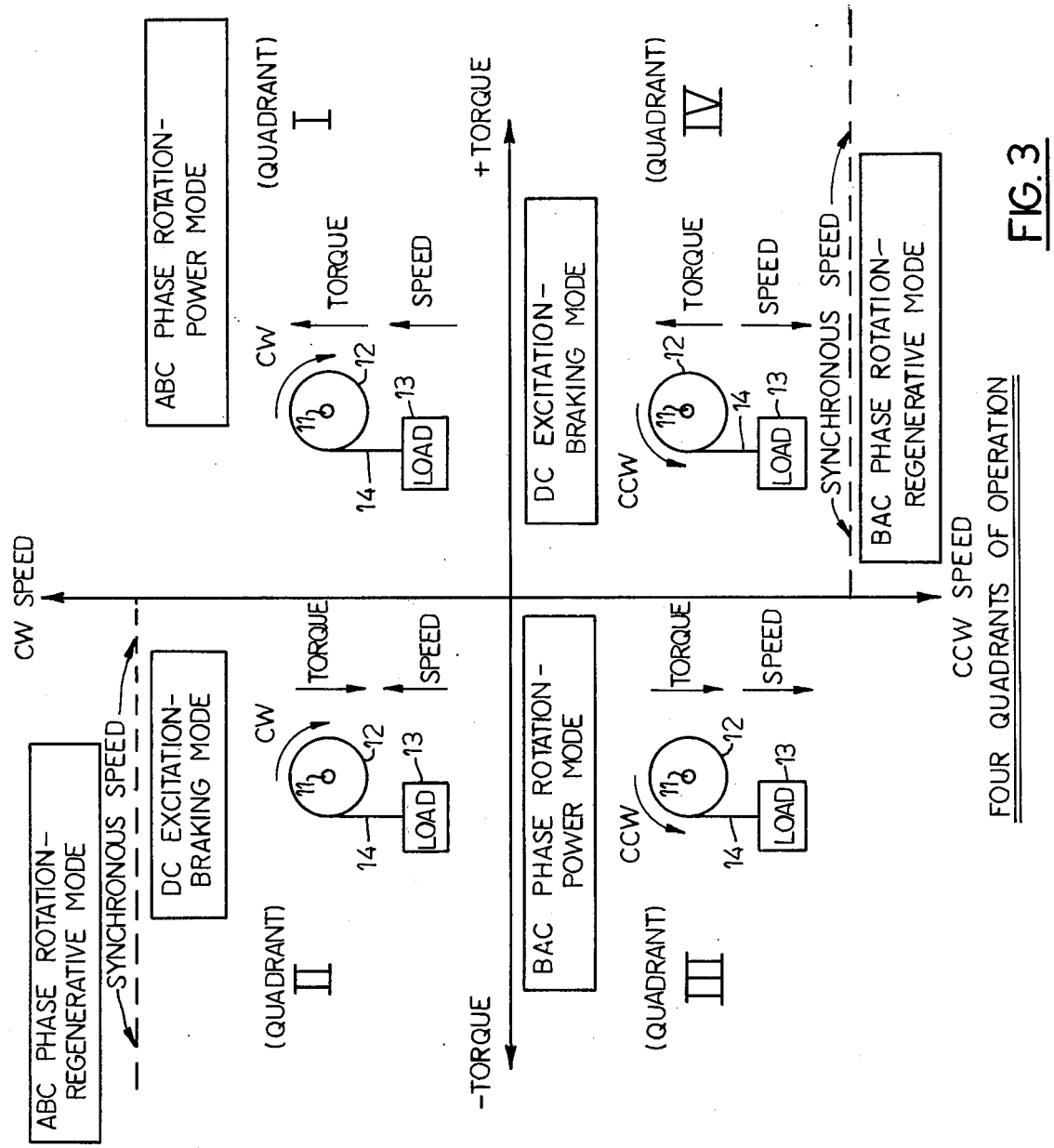
FIG. 3 is a diagram showing motor operation in various modes.

As FIG. 3 shows, motor 10 can operate in various modes. In the power hoisting mode (see quadrant I of FIG. 3) there is ABC phase rotation and speed and torque are in the same direction. The SCR firing order for this mode is: 1A – 2A - 3 – 4A - 5A – 6.

In the power lowering mode (see quadrant III of FIG. 3) there is BAC rotation and speed and torque are in the same direction. The SCR firing order for this mode is: 1B – 2B - 3 – 4B – 5B – 6.

In the brake-while-hoisting mode (see quadrant II of FIG. 3) speed and torque are in opposite directions. The SCR firing order for this mode is: 1A, 2A – 5B, 4B and SCR7, and there is direct current energization of the motor. For regeneration in quadrant II, there is ABC phase rotation and SCR firing order is 1A – 2A – 3 – 4A – 5A – 6.

In the brake-while-lowering mode (see quadrant IV of FIG. 3) speed and torque are in opposite directions. The SCR firing order for this mode is: 1A, 2A – 5B, 4B and SCR7 and there is direct current energization of the motor. For regeneration in quadrant IV, there is BAC phase rotation and SCR firing order is: 1B – 2B – 3 – 4B – 5B – 6.

In the powering modes (quadrants I and III of FIG. 3) where speed and torque are in the same direction, wound rotor motor 10 functions as a motor with positive slip inversely related to speed. The direction of rotation is determined by the phase sequence of the applied stator voltages. Torque, and thus slip speed, is controlled by regulating the applied stator voltage.

Firing order 1A, 2A – 5B, 4B and SCR7, used for direct current braking in quadrants II and IV, results in direct current entering reference phase A (terminal T1) of motor 10 and leaving at reference phase C (terminal T3) of the motor, (where reference phase A of the motor is that phase which has A phase applied to it during ABC phase rotation). Note that SCR1A and SCR2A are fired simultaneously and that SCR5B and SCR4B are fired simultaneously. SCR7 is gated continuously in the direct current braking mode and performs the function of a free-wheeling diode which, when gated "on," smooths the otherwise pulsating d.c. supplied to motor 10 and thereby improves braking efficiency. A braking effect of motor 10 can be obtained either through direct current excitation of stator 21 in accordance with the invention or by conventional regeneration which, however, only occurs at speeds greater than synchronous.

In the regenerative modes (quadrants II and IV of FIG. 3), speed and torque are in opposite directions. The wound rotor motor functions as an induction generator with negative slip. The direction of rotation is determined by the load, but the applied phase sequence must be such that the slip is negative in order for regeneration to occur. Torque and speed are entirely determined by the motor-load characteristics. Thus, there is no system regulation except that which is inherent in the motor's speed/torque curves. Regeneration in quadrant II of FIG. 3 may seem to represent an unobtainable set of conditions, but can occur in certain applications, such as elevator drives, where counterbalance techniques are employed.

In the braking mode of operation (quadrants II and IV of FIG. 3), speed and torque are obviously in opposite directions. The direct current braking technique in accordance with this invention is analogous to braking by means of an eddy current brake; however, most of the heat is dissipated externally by the motor's secondary resistors R1, R2, R3. Direct current voltage is applied to two of the three primary windings to achieve a stationary magnetic field in stator winding 21. The d.c. voltage is obtained by properly gating the SCRs as described hereinbefore. The magnitude of the applied direct current voltage determines the amount of braking. Voltage of the same polarity is used regardless of the direction of rotation.

By proper phase control of the SCRs in bank 22 it is possible to use phases A and C of the power supply lines to obtain a unidirectional direct current in two phases of the motor to provide for dynamic braking. If phase line A is positive with respect to phase line C, current flows from phase line A, through SCR 1A, to terminal T1 of motor stator winding 21, through motor windings A and C, from terminal T3 and then through SCR 2A into phase line C. This provides a halfwave pulse of direct current. When the opposite condition exists, i.e., where phase line C is positive with respect to phase line A, then current flows from phase line C, through SCR 5B, to terminal T1 of motor stator winding 21, through terminal T3 and through SCR 4B to phase line A. The SCRs thus form a single phase full-wave bridge rectifier for the two phases A and C of motor 10. However, pulsating direct current results and braking would be minimal. Therefore, to more closely approximate a true direct current having much less ripple, a free wheeling diode in the form of SCR7 is provided across phase lines A and C. A controlled rectifier is required because, when motor 10 is the alternating current mode of operation, current cannot be permitted to flow between phases C and A because a direct short circuit would result. Therefore, during any alternating current mode of operation, SCR7 is turned "off". In the direct current mode of operatin, SCR7 is turned "on." In normal operation, SCR7 will not conduct when the voltage across it is of the wrong polarity for conduction. The control signal for SCR7 is provided by firing circuit 40 and is a simple direct current gating signal.

With SCR7 "on" (once d.c. flow is established) whenever the applied d.c. voltage becomes low enough current starts to drop off. As a result, the windings of motor 10 (like any other inductor) try to maintain the current and will reverse their polarity. But as soon as the polarity reverse on the motor, the free-wheeling SCR7 has the capability of conducting to provide a free-wheeling current flow around the loop through SCR7 into T1 out of T3 and back into the SCR7 again. The pattern developed for one full cycle of the line is: (1) conduction from A phase of the line, into A phase of the motor, out C phase of the motor, back to C phase of the line; (2) a free-wheeling step where there is free-wheeling from terminal T1 to T3 through SCR7 and back to T1; (3) conduction from phase C of the line to T1, to T3 to phase A of the line; and (4) another free-wheeling step through SCR7. This pattern occurs during any running operation which requires d.c. braking. In a typical operation, motor 10 goes into the d.c. braking mode whenever the actual speed of the motor exceeds the reference speed which the drive is calling for. This could be in either the hoisting or lowering direction. In the direction, the only time d.c. braking is required is during a transition period (except for counterbalanced systems). On the other hand, in the lowering direction, where the general tendency is for the load to always overhaul the motor, d.c. braking is a steady state occurrence. The only time d.c. braking is not required in the lowering direction is when the speed of the motor is exceeding synchronous speed in which case regenerative braking, using the motor as an induction generator, occurs.

In accordance with another aspect of the invention, emergency braking means are provided to prevent the load from falling at high speed under the force of gravity (with obvious undesirable consequences), in the event that the electromechanical brake 16, while deenergized and set, undergoes a mechanical failure while the system is deenergized and a load 13 is suspended from hoist drum 12. The emergency braking means comprise tachometer 20, a single phase full-wave rectifier 45, dynamic braking contactor DB (having contacts DB2 and DB3), a three phase full-wave rectifier 60, and a secondary contactor SC (having contacts SC1 and SC2). Full-wave rectifier bridge 45 has input terminals 41 and 42 connected to the output terminals TC1, TC2, respectively, of the tachometer generator 20. The rectifier 45 converts the polarity reversing direct current signal of tachometer generator 20 into a constant polarity direct current voltage at output terminals 43, 44 of the bridge 45 (assuming rotation is occurring) and applies it to the stator (primary) winding 21 of the motor 10 (across terminals T1 and T3) through the normally closed contacts DB2 and DB3, which are adapted to close whenever the system is deenergized. Direct current flows from bridge terminal 44 through closed contact DB2 to motor terminal T1, out of terminal T3, through closed contact DB3, and back to bridge terminal 43. Since a.c. motor 10 does not have a residual magnetic field (unlike a d.c. motor where there is always a residual magnetic field), the d.c. current from the rectifier 45, applied to the motor stator 21, is needed to initiate a small magnetic flux in the motor (as small as 200 milliamps, for example, for a 40 h.p. motor). Since the motor 10 is rotating under the force of gravity acting on the load 13, the small stationary magnetic flux field induces a voltage in the rotor (secondary). Since the normally open contacts SC1 and SC2 have opened in response to the fact that the system is deenergized, the induced rotor (secondary) voltage is applied to three phase full-wave rectifier 60. The rectified output voltage of rectifier 60 produces a current out of terminal 62 through DB2, T1, T2, DB3 and back into terminal 61 thus producing a larger magnetic flux in the stator (primary). As the magnetic field increases and as the direct current flow being generated by the motor via rectifier 60 increases, dynamic braking of the motor occurs and motor speed stabilizes at some low percentage of maximum speed. For example, if the motor has a synchronous speed of 1200 rpm, a typical motor speed when hoisting with a 100% hook load would be 960 rpm. In the present embodiment, the system finds a stable speed point which is about 40% of 100% hook load speed, which is about 380 rpm. These speed ranges are for maximum hook load, and in the event of smaller hook loads, load descent speed would be lower. In actual operation higher speed fall of the load might occur (depending on exact conditions) for about one-quarter of a second before the stable speed condition is arrived at.

GENERAL DESCRIPTION OF CIRCUITS AND COMPONENTS AND THEIR MANNER OF OPERATION

Conversion Logic and Regulator Circuit

As FIG. 2 shows, induction master control 33 and the following contactors and relay coils are energizable from the secondary winding of a transformer 37 connected across phase lines B and C when the various contacts in series therewith are closed; a dynamic braking contactor DB; a secondary contactor SC; a run control relay RCR; a master control relay CR1; a raise control relay CR2; a lower control relay CR3; a lowering reed relay LRS; a main contactor MC; a main contactor timer MCT; a brake relay BR; a run reed relay RRS; and a slow down reed relay SDR. FIG. 2 also depicts certain contacts operated by the aforementioned contactors and relays and also shows five limit switches L1, L2, L3, L4 and L5 for power limit, upper stop, lower stop, upper slowdown and lower slowdown, respectively.

As FIGS. 1 and 2 show, induction master control 33 has an operator's control handle 34 enabling it to be operated to a hoist speed point XH to close its hoist contact H or to a lower speed point XL to close its lowering contact L. Induction master control 33 also comprises a variable output transformer 36 which provides a variable output alternating current voltage signal at its output terminals 38 and 39, which signal is proportional to handle throw and is used for speed control purposes.

As FIGS. 1 and 4 show, the conversion logic circuit 30 comprises a series of sub-circuits; namely, a ring demodulator absolute value circuit 50; an anti-rollback circuit 51; a regeneration trigger and alpha limit lock-out circuit 52; a plugging logic and override reference circuit 53; a regulator output buffer circuit 54; a freewheeling SCR logic circuit 56; and a phase rotation logic circuit 55.

The output terminals 38 and 39 of induction master control 33 are connected to ring demodulator circuit 57 and from thence to the conversion logic circuit 30. As FIG. 2 shows, the incoming directional signal from the induction master control 33 (either hoist or lower) picks up the raise control relay CR2 or the lower control relay CR3. Closure of CR3 picks up LRS. Pick up LRS energizes LRSA in conversion logic circuit 30, as FIG. 4 shows. When CR3 is not picked up, neither is LRS; HRSA, therefore, picks up on conversion logic circuit 30.

The ring demodulator circuit 57 senses the phasing coming from induction master control 33 and provides a direct current signal which is positive in the raise direction and negative in the lower direction. But, since the system does not require polarity reversal at point 70 in FIG. 4, an operational amplifier 316 in circuit 50 acts on the input signal so as to always provide a positive polarity output signal; i.e., an absolute value signal, which is a current signal, being changed thereto by a resistor 319.

All input signals to the regulator circuit 31 are current references which vary in value. The nature of the signal from the summing point SP to regulator 31 is a direct current reference signal and depends upon the error conditions that exist between the speed reference signal and the speed feedback signal. The error signal is either a positive or negative current signal which varies in magnitude and, therefore, the regulator 31 responds to both the polarity and the magnitude of the error signal. The signal polarity thus determines whether the motor should brake or power. The signal magnitude determines the extent of braking or powering. Speed reference is low for low motor speed and high for high motor speed and typically varies from 0 to 10 volts positive.

The anti-rollback circuit 51 provides a signal which eliminates the tendency of a heavy load 13 on the hoist 12 from causing the hoist and motor to operate in the lowering direction as the induction master control handle 34 is moved from neutral to raise and the electromechanical brake 16 is released. The anti-rollback circuit 51 senses the polarity (i.e., direction) of the speed feedback signal from tachometer 20 and if that polarty is in the wrong direction for raising (i.e., is positive when it should, in fact, be negative to effect raising), the anti-rollback circuit 51 provides a signal at point 72 (FIG. 4) which causes the system to operate in the proper direction.

The regeneration trigger and alpha limit lock-out circuit 52 provides an output signal which triggers the system to enable motor 10 to operate in the regeneration mode. This trigger is required since, if motor 10 is operating in the lower direction, braking, and at a speed sufficient for regeneration (whereby the motor operates as a generator and returns power to the line), but if the speed feedback signal and the speed reference signal are matched, the system would not normally regenerate because the speed requirements are being met. However, the regeneration trigger and alpha limit lock-out circuit 52 senses the speed feedback signal from tachometer 20 and, when the speed feedback signal is equal to a speed at which regeneration should occur, circuit 52 provides a signal at point 73 (FIG. 4) which causes the drive to seek a faster speed. Thus, the drive transfers into the powering mode, even if it was in the braking mode, and when this occurs motor speed is sufficient to cause regeneration.

The alpha limit lock-out portion of circuit 52 establishes a maximum phase-on angle for the thrysistor bank 22 at point 76 (FIG. 4) which is coordinated with the regeneration mode. When motor speed gets so high (i.e., exceeds synchronous speed), such that regeneration is possible, the regenerative reference signal 73 comes into play and puts a booster signal into summation point SP which causes a transfer to a motoring mode and which operates the drive to drive faster in the lower direction. However, by going faster in the lower direction a transfer into the regenerative mode occurs which is speed limited by the natural speed-torque characteristics of the motor. The regeneration alpha limit coming in from point 76 limits the phase angle of the SCRs and, once entered, the regenerative mode is self-sustaining.

The plugging logic circuit 53 senses if the induction master control 33 is calling for one direction of rotation while motor 10 is rotating in an opposite direction and provides a signal to the regulator circuit 31 that causes the drive to reverse direction by d.c. braking and then plugging the motor. The circuit 53 is in two similar sections to enable plugging to be initiated regardless of the direction of rotation of motor 10.

The regulator output buffer circuit 54 provides an on or off signal at point 77 (FIG. 4) indicative of whether or not there is a motoring command.

The free-wheeling SCR logic circuit 56 senses whether braking is required and operates to close its contact K3 to turn on SCR7.

The phase rotation logic circuit 55 comprises two motoring command relays K1 and K2 having relay contacts K11, K12 and K21, K22, respectively. Contacts K11 and K22 control energization of command signal lines M9 and M11, and contacts K12 and K21 control energization of line M10. During braking, relays K1 and K2 are deenergized and contacts K11, K12 and K21, K22 are open because it is unnecessary to supply motoring power to motor 10. However, when motor 10 requres powering, one of the relays K1 or K2 will energize and close its contacts, depending on whether the induction master control 33 calls for powering in the raise or lower direction.

The motoring command signal is a variable d.c. control signal (always positive) which changes in voltage level to control the amount of "phase-on" required for particular SCRs in bank 22. With a small (low voltage) d.c. control signal applied to FPG1 or FPG2, the amount that an SCR device would phase-on would be small, thereby providing a low voltage at the primary of motor 10. As the control signal becomes larger, the phase angle or conduction angle of the SCRs will become larger, and ultimately the voltage being applied to the primary of motor 10 will be full line value. A more detailed description of the conversion logic circuit 30 shown in FIG. 4 is provided at the end of this specification.

THE FIRING PULSE GENERATORS

FIG. 5 shows that firing pulse generator FPG1 receives energization and phase synchronization signal information from a transformer set TA which has delta wound primary windings 401 (connected between phase lines A and B), 402 (connected between phase lines B and C), and 403 (connected between phase lines A and C). The phase synchronization signal from transformer TA enters firing circuit FC3 through resistors R16 and R7. FC1 and FC2 have similar phase synchronization inputs. Firing pulse generator FPG1 also receives basic control signal information from lines M9 and M10 which are connected to the conversion logic circuit 30. The firing circuit FC3 functions to combine the phase synchronization signal and the basic control signal and provides an output signal to the pulse amplifier circuits PA5 and PA6 through the pulse transformers T1 or T2, respectively. As the basic control signal increases in amplitude to an increasingly higher d.c. voltage, phase-on will occur with respect to the phase synchronization signal which is also coming in. When there is a small voltage coming in at line M9 from conversion logic circuit 30 a small conduction angle is provided. When a large d.c. signal voltage comes in at line M9 (and this is with respect to the common for the control signal), there will be a large conduction angle. The line synchronization signal comes in through resistors R16 and R7 and merely gives a phase starting point; i.e., a zero crossing. The signal for the amount of phase-on (the conduction angle) comes in as a d.c. signal through lines M9 and M10. Once the required firing angle is determined, a pulse is generated by transformer T1 or transformer T2 and is fed into pulse amplifier PA5 or PA6, respectively, which fire 180° apart, where it is then amplified and widened and ultimately applied to SCR2A or SCR5A, respectively. The extent of phase-on is determined by circuit 31 via circuit 30. When only a small conduction angle is required, then conversion logic circuit 30 transfers a small d.c. signal. When a large conduction angle is required then the conversion logic circuit 30 transfers a large d.c. voltage. The circuit 31 thus determines the conduction angle, but the output of the control circuit 31 is a d.c. signal and the firing pulse generator FPG3 converts that d.c. signal into a true phase output.

As FIG. 5 shows, the firing circuits FC1, FC2 and FC3 are substantially identical and therefore only firing circuits FC3 and FC1 are shown in detail. Similarly, the pulse amplifier circuits PA1 through PA6 are similar to each other and therefore only the components of two pulse amplifier circuits PA6 are shown in detail.

The primary windings 401, 402 and 403 of transformer TA are coupled to transformer secondary windings 404, 405 and 406, respectively. As FIG. 5 shows, two sections of transformer secondary winding 404 are coupled to the pulse amplifiers PA1 and PA2. Similarly, the two secondary windings 405 are coupled to the pulse amplifiers PA3 and PA4. Similarly, the two sections of secondary windings 406 are coupled to the pulse amplifiers PA5 and PA6. A third section of each transformer connects to FC1, FC2 and FC3, respectively.

FIG. 6 shows that firing pulse generator FPG2 receives energization and phase synchronization signal information from a transformer set TB which has primary windings T201 (connected between phase lines A and B), T202 (connected between phase lines A and C), and T203 (connected between phase lines C and A). The phase synchronization signal from transformer TB enters firing circuit FC3 through resistors R16 and R7. Firing pulse generator FPG2 also receives basic control signal information from lines M11 and BC which are connected to the conversion logic circuit 30. The firing circuit FC3 functions to combine the phase synchronization signal and the basic control signal and provides an output signal to the pulse amplifier circuits PA5 or PA6 through the pulse transformers T1 or T2, respectively. As the basic control signal increases in amplitude to an increasingly higher d.c. voltage, phase-on will occur with respect to the phase synchronization signal which is also coming in. When there is a small voltage coming in at line M11 from conversion logic circuit 30 a small conduction angle is provided. When a large d.c. signal voltage comes in at line M11 (and this is with respect to the common for the control signal), there will be a large conduction angle. The line synchronization signal comes in through resistors R16 and R7 and merely gives a starting point; i.e., a zero crossing. The signal for the amount of phase-on (the conduction angle) comes in as a d.c. signal through lines M11 and BC. Once the required firing angle is determined, a pulse is generated by transformer T1 or transformer T2 and is fed into pulse amplifier PA5 or PA6, respectively, which fire 180 degrees apart, where it is then amplified and widened and ultimately applied to SCR2B or SCR5B, respectively. The extent of phase-on is determined by circuit 31 via circuit 30. When only a small conduction angle is required, then conversion logic circuit 30 transfers a small d.c. signal. When a large conduction angle is required then the conversion logic circuit 30 transfers a large d.c. voltage. The circuit 31 thus determines the conduction angle, but the output of the control circuit 31 is a d.c. signal and the firing pulse generator FPG2 converts that d.c. signal into a true phase output.

As FIG. 6 shows, the firing circuits FC1, FC2 and FC3 are substantially identical and therefore only firing circuits FC3 and FC1 are shown in detail. Similarly, the pulse amplifier circuits PA1 through PA6 are similar to each other and therefore only the components of pulse amplifier circuits PA6 and PA1 are shown in detail.

The primary windings T201, T202 and T203 of transformer TB are coupled to transformer secondary windings S201, S202 and S203, respectively. As FIG. 6 shows, two sections of transformer secondary winding S201 are coupled to the pulse amplifiers PA1 and PA2. Similarly the two secondary windings S202 are coupled to the pulse amplifiers PA3 and PA4. Similarly, the two sections of secondary windings S203 are coupled to the pulse amplifiers PA5 and PA6. A third section of each transformer connects to FC1, FC2 and FC3, respectively. A more detailed description of the firing pulse generators shown in FIGS. 5 and 6 is provided at the end of this specification.

OPERATION

Power Hoist

Referring to FIG. 3, quadrant I, speed and torque are both in the upward direction, which would be the case with a load 13 on the hoist 12. The induction master 33 sends a direction reference signal into the conversion logic circuit 30 indicating the raise direction. At the same time the induction master 33 sends an alternating current variable reference voltage into the ring demodulator 57 which converts this signal to a direct current reference (speed). This reference in turn is converted by the conversion logic circuit into a single polarity signal by means of the ring demodulator absolute value circuit 50, which emerges as a speed reference signal which goes to the summing point SP. The error signal from the summing point SP goes into the regulator 31. Because operation is in quadrant I which requires powering, the reference which will apply will be a motoring command, which then goes from the regulator 31 into the conversion logic circuit 30. The conversion logic circuit 30 then determines which of the reed switches K1 or K2 will pick up. In this situation the reed switches K11 and K12 pick up to transfer output signals. These signals are sent into firing pulse generator 1 sections FC1 and FC3 by way of line M9 and also into firing pulse generator 1 section FC2 by way of line M10, causing SCR4A, SCR1A, SCR6, SCR3, SCR2A and SCR5A to fire, which causes an A-B-C phase rotation on the motor 10 and powering up occurs. As soon as motor 10 starts to rotate, the tachometer 20 produces an output, which goes through the tachometer check circuit—which determines that there is an output and by means of a resistor (not shown) located in that circuit converts the voltage signal on the tachometer into a current signal. The speed adjust circuit —comprises another series of resistors (not shown) which trim that signal to whatever maximum speed is desired. The tachometer speed signal appears as the speed feedback signal and enters into the summing point SP and is then fed back into the regulator 31. This process takes place on a continuous basis. By summing the speed reference signal from the conversion logic circuit 30 with the speed feedback signal from the tachometer 20, an error signal is produced which is proportional to the sum of those two signals. The error signal is processed by the regulator 31 circuit and converted into a motoring command which provides for sufficient phase angle adjustment of the SCRs to maintain whatever speed is called for.

Power Hoist Speed Increase

Under the condition of powering up with a load 13 on hoist 12 and with a speed increase command, the system functions as described, except that when the increase in command occurs, the speed reference signal dominates over the speed feedback signal and temporarily provides a stronger motoring command output signal which phases the SCRs on far enough so as to provide for motor acceleration. When the motor 10 has accelerated to the point where the speed feedback signal again almost matches the speed reference signal, a steady state condition arises and speed continues at that speed. The phase sequence relationship of the SCRs stays the same, but the amount of phase-on of the SCRs increases, thereby increasing the voltage applied to the motor 10, until it accelerates to the proper speed. Then, phase back again occurs as far as possible while still maintaining the proper motor speed. At full speed command, full phase-on is provided at all times.

Power Hoist Speed Decrease

Under the condition of powering up with a load 13 on the hoist 12 and with a speed decrease command, the system performs as folows. The speed feedback signal will dominate over the speed reference signal because the reference is calling for a lower speed than the speed feedback indicates exist. A reversal in polarity of the error signal results and exists as long as the speed reference signal dominates over the speed feedback signal. Under this situation a negative error signal goes into the regulator 31. Therefore, instead of a motoring command, a braking command is transmitted into firing pulse generator FPG3, firing circuit FC2. In effect, there is a shift from quadrant I into quadrant II in FIG. 3. In quadrant II, the speed is still in the same direction (the direction of rotation of the motor shaft 11 has not reversed), but the direction of the torque is reversed, and the system goes temporarily into the braking mode, since braking must occur until the motor 10 has achieved the speed the induction master 33 is calling for. When that occurs, the system drops back into the initial condition where the speed reference signal exceeds the speed feedback signal, and powering occurs at a lower speed.

Power Lower

Referring to FIG. 3, quadrant III, power lowering occurs only when there is a light load 13 on the hoist 12, such as a load which is not heavy enough to overhaul due to friction losses, etc. The induction master 33 sends a direction reference signal into the conversion logic circuit 30 indicating lowering operation. Simultaneously, induction master 33 sends a speed signal into the ring demodulator circuit 57 which, in turn, produces a signal which is sent into the conversion logic circuit 30 for conversion to a speed reference signal by means of the absolute value amplifier circuit and transmission to the regulator summing point SP. The summing point SP cannot distinguish between a "down" or "up" signal. The conversion logic circuit 30, however, recognizes this and actuates the appropriate reed switches K11, K12 or K21, K22. Assuming that a speed for motor 10 has not yet been established, the speed reference signal produces an error signal which is positive an goes into the regulator circuit 31 wherein it is converted to a motoring command at 7. Then, instead of switches K11 and K12 picking up by means of coil K1 on the conversion logic circuit as formerly, because an opposite direction is indicated, reed switch coil K2 picks up and the motoring command is transmitted through switches K21 and K22 through lines M10 and M11, which means that firing pulse generator 1, firing circuit FC2 and firing pulse generator 2, firing circuits FC1 and FC3 are actuated. Thus, instead of an A-B-C phase rotation in the motor 10, there is a B-A-C rotation instead, which tends to produce torque in the opposite powering direction from that which existed under the first situation. As before, the tachometer 20 starts to rotate and produces a speed feedback signal back into the summing point SP and the error signal to regulator 31 assumes a magnitude necessary to maintain the motor speed which is called for by induction master 33.

Power Lower Speed Increase

During power lowering, if the operator calls for a higher speed, there is a momentary phase-on to increase speed, and as soon as speed increases to the speed level required, the SCRs again phase back and provide a proper speed, with no shifting of quadrants.

Power Lower Speed Decrease

During power lowering, if the induction master 33 calls for a lower speed there is a transfer from quadrant III into quadrant IV. The system functions in the same manner as when it transferred from quadrant I to II, in that a braking command is produced because the feedback signal exceeds the speed reference signal. The regulator 31 then produces a braking command for firing pulse generator FPG2, firing circuit FC2 and again produces a d.c. current in the motor 10 which provides braking. As soon as the new speed is attained there is transfer back into the powering mode.

Brake While Lowering

Referring to FIG. 3, quadrant IV, if there is a heavy load 13 on the hoist 12 sufficient to create an overhauling situation during operation in the lower direction, operation is in quadrant IV. A direction reference signal goes from induction master 33 into the conversion logic circuit 30 calling for the lower direction and the induction master 33 produces a signal for the ring demodulator circuit 57. The signal from the ring demodulator circuit 57 is changed by the conversion logic circuit 30 to a unity polarity signal which comes out as a speed reference signal into the summing point SP to provide an error signal for the regulator circuit 31. Because the load 13 is overhauling, it is unnecessary to apply power to the motor 10 to get the shaft 11 to rotate. Therefore, as soon as the system started up, the load 13 starts in the lower direction because of gravity. This rotation produces a speed feedback signal from the tachometer 20 which almost immediately exceeds the speed reference signal because the load 13 is overhauling. In the other conditions hereinbefore described, initially there was always a positive error signal. In the present situation being described there is a negative error signal which immediately produces a braking command. The braking command is at whatever amplitude is necessary to maintain the speed of motor 10 at the speed reference signal called for by the induction master 33. If a high speed is required, the braking command is such to permit high speed. If a lower speed is required, the braking command is such as to permit low speed. The error signal has reversed polarity and therefore, braking rather than motoring, is being called for. If under this situation the induction master 33 calls for a lower speed, which would indicate that even more braking is needed, there is no transfer from quadrant IV to other quadrants. For a short period of time a larger braking command is produced to achieve slow-down, and then it will phase back and produce a smaller braking command necessary to maintain the speed of motor 10. If, on the other hand, operation is in the braking mode and the operator momentarily calls for a higher speed, there is a possibility, depending on how fast the operator actuates induction master 33 to change the reference speed and also how fast the load 13 accelerates, that a reversal in error signal will occur because the speed reference will, at least for a short period of time, exceed the speed feedback. This means that for a short period of time there is a transfer over into a motoring command (i.e., a change from quadrant IV to quadrant III), and the output signals on lines M10 and M11 tell the drive to accelerate in the lower direction. However, because the load 13 is overhauling, this is strictly a transient situation and as soon as proper speed is reached there again is transfer back into the braking mode.

Regeneration

Whenever speed in the lower direction is sufficiently high such that regeneration can occur (overhauling loads only), the regneration tirgger circuit will cause the drive to transfer to this mode automatically. Such operation will continue until a speed reference decrease takes place. Speed is not regulated in the regenerative mode.

Detailed Description of Conversion Logic Circuit And Firing Pulse Generators

As FIG. 4 shows, the conversion logic circuit 30 basically comprises seven subcircuits, namely the ring demodulator absolute valve circuit 50, the regeneration trigger and alpha limit lockout circuit 52, the anti-rollback circuit 51 and plugging logic circuit 53, the regulator output buffer circuit 54, the free wheeling SCR logic circuit 56, the phase rotation logic circuit 55 and the reed switch master reference circuit 59.

The reed switch master reference circuit 59 will be described first since contacts which it operates are used elsewhere in the system. The basic input signal to the reed switch master reference circuit is the state of reed switch LRS, shown in FIGS. 2 and 4. Reed switch LRS is operated whenever the operator puts the induction master handle 34 in any lower position. If the induction master handle 34 is in either the neutral position or any hoist position, reed switch LRS will not close and will be in an open state. When switch LRS is in the open state, transistors 301 and 302 are in cutoff, transistor 303 is in saturation, and thus, the hoist reed switch HRSA picks up. On the other hand, when lower reed switch LRS is closed, transistors 301 and 302 are in saturation and transistor 303 is in cutoff. In this condition the lower reed switch LRSA is picked up. It should be noted that these two reed switches LRSA and HRSA are interlocked so that only one or the other can be picked up at any one time. Switches LRSA and HRSA act as an interface for all directional information needed by the conversion logic circuit 30.

The primary function of the regulator output buffer circuit 54 is to provide a positive logic signal whenever the regulator is calling for the powering mode. Transistors 304 and 305 provide for this function. Of equal importance is the fact that the impedances of this circuit are such that only negligible additional loading is placed on the regulator circuit.

The phase rotation logic circuit 55 determines which of the firing pulse generators FPG1, FPG2 receives the powering reference from the regulator circuit 31. Assume, for example, that the operator has placed induction master handle 34 in any hoist position. Reed switch HRSA will be picked up as previously described. Further assume that the regular circuit 31 has not yet produced a powering output. Under these assumed conditions, transistor 306 will turn on. This, in turn, will energize reed switch K1. Simultaneously, the regulator circuit 31 will begin to produce a powering output. This output will be channelled to firing pulse generator FPG1 through the closed contacts K11 and K12. This will cause an ABC phase sequence to be applied to the stator of the motor 10. The magnitude of the voltage applied will be determined by the magnitude of the output of the regulator circuit 31. In a similar manner, if the operator had placed handle 34 in any lower position, reed switch LRSA would have picked up. This, in turn, would turn on transistor 307 which would then energize reed switch K2. Simultaneously again, the output would be channelled through closed contacts K21 and K22 to firing pulse generator FPG2, firing circuits FC1 and FC3 and also to firing pulse generator FPG1, firing circuit FC2. This, in turn, would cause a BAC phase sequence to be applied to the motor. Again, the magnitude of the voltage would be determined by the magnitude of the output of the regulator circuit 31. Once either K1 or K2 has picked up, pickup of the opposite reed switch is prevented by interlocking. Thus, it is clear that the operator's handle 34 ultimately determines the pickup of K1 or K2. However, once one or the other of these reed switches has been energized, switchover to the opposite reed switch cannot be instantaneous. This is true because, once one phase sequence has been determined for the motor 10, another phase sequence cannot be applied to the motor until current has gone to zero. Logic is provided to insure that this current zero condition exists. Current can only flow when the regulator circuit 31 has an output. The regulator output buffer circuit 54 provides a logic signal to tell whether this output exists or not. The output of the regulator buffer circuit 54 is connected to bases of transistors 306 and 307 through diodes 308 and 309, respectively. Thus, if transistor 306 was originally turned on by the closure of contact HRSA and if the output of the regulator output buffer circuit 54 is high, transistor 306 will be maintained on even if the contact HRSA opens. Likewise, if transistor 307 was originally turned on by LRSA and if the regulator output buffer is high, transistor 307 will be maintained on even though reed switch LRSA opens. Thus, once either K1 or K2 has been picked-up it cannot drop out until current goes to zero. Since K1 and K2 are interlocked, this simultaneously insures that the opposite reed switch cannot pickup until current has gone to zero. Transistors 310 and 311 provide a complementary lockout function of the regulator output buffer signal once either reed switch K1 or K2 has been chosen. If K1 has been chosen, transistor 310 will be off, allowing the regulator output buffer signal to reach transistor 306 and maintain the K1 contact closed. Simultaneously, transistor 311 will be turned on, thus bypassing any signal from the regulator output buffer circuit 54 such that it cannot each transistor 307 and possibly turn on reed switch K2. On the other hand, if reed switch K2 has been chosen, transistor 311 will be off, allowing the signal from the regulator output buffer circuit 54 to reach transistor 307 and maintain the K2 contacts closed. Simultaneously, transistor 310 will be on, bypassing any signal from the regulator output buffer circuit 54 and, thus, preventing any possible turn on of transistor 306 and simultaneous pickup of K1. Transistor 312 is used merely as an interface for the regulator output buffer logic circuit 54.

The free wheeling SCR logic circuit 56 provides for gating of the free wheeling SCR7 when system conditions are proper. The signal at point 313 comes from the regulator circuit 31. It is positive whenever braking is called for. This positive signal turns on transistor 314 which energizes reed switch K3. The K3 contact closes to complete the circuit from the free wheeling SCR firing circuit 56 to the gate of SCR7. It is important to note that the signal at point 313 leads the signal BC which is being applied to firing circuit FC2 of firing pulse generator FPG2. Therefore, when DC braking ceases to be called for, the signal BC will be maintained after the signal at point 313 disappears. Therefore, the gating of free wheeling SCR7 will be dropped prior to the removal of gating to SCRs 1A, 2A, 4B and 5B. This insures that all free wheeling current will cease before trying to reapply a powering AC phase voltage to the motor 10. Transistor 315 provides a lockout such that at not time can the free wheeling SCR7 be gated until the powering output of the regulator circuit 31 has been zero for a specified period of time. This insures that all powering current has gone to zero before gating the free wheeling SCR 7.

The remaining three subcircuits on the conversion logic board, namely, the ring demodulator absolute value circuit 50, the regeneration trigger and alpha limit lockout circuit 52 and the anti-rollback circuit 51 and plugging logic circuit 53 are used for providing references to the summing junction SP of the regulator circuit 31.

The ring demodulator aboslute value circuit 50 provides the basic speed reference for the entire drive system. It takes its input from the output of the ring demodulator circuit 57. This output is a DC signal which is positive for the raise direction and negative for the lower direction. It is the function of the ring demodulator absolute value circuit 50 to take this polarity reversing signal and change it to a single positive polarity signal, regardless of the polarity of the input. This is done by operational amplifier 316 in association with diodes 317 and 318. This circuit provides a current reference to the summing junction SP of the regulator 31 through resistor 319.

If motor 10 is already in the powering mode and its speed exceeds synchronous speed, transfer over into a regenerative mode as an induction generator is automatic. However, if the motor 10 is being used in a DC braking mode and its speed exceeds synchronous speed, there is no such natural transfer into the regenerative mode. Therefore, a circuit must be provided to create this transfer whenever synchronous speed is exceeded. It is the function of the regeneration trigger and alpha limit lockout circuit 52 to provide this function. As previously mentioned, this system employs a DC tachometer 20 for speed feedback. The DC tachometer 20 is used in this instance to provide the speed trigger signal to the regeneration trigger and alpha limit lockout circuit 52. When operating in the lower direction and reaching synchronous speed, the positive signal from the tachometer 20 at point 320 will become sufficiently high to override the negative bias into transistor 321. Therefore, transistors 321 and 322 will turn on. The turn on of transistor 322 provides a speed increase signal into the summing point SP of the regulator 31 through network 323. Because network 323 contains a capacitor, the speed increase signal will be only momentary. Once, however, the regulator 31 has transferred to the powering, or in this case, regenerating mode, an additional signal will be applied from the regulator output buffer circuit 54 thorugh resistor 324 into the summing junction SP of the regulator 31. The magnitude of this additional speed signal is chosen so that in all normal operating conditions the speed of the motor 10 will not be capable of obtaining the requested speed. Therefore, the regulator 31 will be maintained in the powering mode, and the system will continue to regenerate. A similar action would occur in the hoisting direction, if synchronous speed could be reached. Such a condition might occur in some counterbalanced hoist drives, such as an elevator drive, where under certain load conditions the load becomes overhauling in the hoisting direction. In this case the signal at point 325 will be sufficiently negative to overcome the positive bias into the base of transistor 326. This will turn transistor 326 on. Simultaneously, transistors 327 and 322 will be turned on. The turn on of transistor 322 initiates regenerative action just as it did in the lowering case. Transistor 328 is provided to lock out the regenerative signal from the regulator output buffer circuit 54 whenever regeneration is not being requested. When regeneration takes place in the motor 10, a basic phase shift occurs between the voltage and the current in the motor stator 21 from that phase relationship which normally exists in the powering mode. In order to compensate for this phase shift it is necessary to limit the maximum phase on angle which the regulator 31 can call for. Transistor 39 performs this function. Whenever regeneration is initiated by transistor 322, a signal is applied to the base of transistor 329, turning it on. The collector of transistor 39 is connected through a resistor 330 to the regulating voltage in the regulator. The resistor 330 effectively clamps the maximum output which the regulator 31 can obtain. Clamping of this regulator output in effect limits the maximum phase on angle which is obtainable at the SCRs.

Rollback is a condition on hoist drives whereby, when the hoisting direction is initially called for, pickup of the brake will occur before sufficient hoisting torque to hold the load is established. If this condition occurs, there will be a short period of time during which the load will actually go in the lower direction, despite the fact that the hoisting direction is being called for. It is important to limit this rollback to a minimum. One of the functions of the anti-rollback and plugging logic circuits 51 and 53 is to minimize this rollback. When the raise direction is called for, the tachometer 20 should always provide negative feedback. If at any time the polarity of the tachometer 20 becomes positive, this is an indication that rollback is occuring. The tachometer signal is brought in at point 331. When the raise direction is called for, as previously drescribed, reed switch HRSA will close. Therefore, the signal at point 331 is applied to operational amplifier 332. This operational amplifier has a noninverting high gain when HRSA is closed. Therefore, any small positive voltage which occurs at point 331 will create a high positive voltage at the output of operational amplifier 332. This output voltage is, in turn, applied through network 333 to the speed reference summing junction SP of the regulator 31. Thus, if rollback starts to occur, immediately a compensating signal is created and applied at the input to the regulator 31. If it is posible for the load 13 to overhaul in the raise direction, as was previously mentioned for an elevator drive, rollback can also occur when going to first point lower. At first point the lower reed switch LRSA will be closed. Thus, any negative voltage which appear on the tachometer 20 and which is brought in at point 331 will be applied through LRSA to operational amplifier 332. In this case the operational amplifier 33 assumes a high gain inverting relationship and, again, a positive signal is generated at its output. Likewise, again, this positive signal is supplied through network 333 to the speed reference summing junction SP of the regulator 31 telling the regulator 31 that an increase in speed is required to eliminate the rollback.

The second functions of the anti-rollback and plugging logic circuits 51 and 53 is to provide for proper system functioning when plugging is being called for by the operator. When going at high speed in one direction and calling for plugging, it is desirable to use the DC braking mode to brake the drive down to a low speed before using a counter-torque mode of operation to physically reverse the direction of motor rotation. Therefore, it is necessary to initially apply an overriding negative signal to the regulator speed summing junction SP, until the motor speed is brought down to a predetermined low level and then apply a positive signal to the speed summing junction SP to physically reverse the direction of motor rotation. How this is accomplished will now be described.

Assume that the drive has been operating at full speed in the lower direction and that the operator plugs to the raise mode. At this time the HRSA contacts will close. However the drive for a period of time will still be traveling in the lower direction. Therefore, the tachometer signal will be positive. This positive tachometer signal will be applied simultaneously to the base of transistor 335 and to the noninverting input of operational amplifier 332. However, whereas the operational amplifier 332 has some integration time during to the capacitor across its input to output, the transistor stage 339 has no integration and will operate faster. Therefore, transistors 335, 336 and 337 will turn on. The turn on of transistor 337 applies a negative input to the noninverting input of operational amplifier 332. This negative input overcomes, or overrides, the positive input being appled through HRSA and drives operation amplifier 332 into negative saturation such that no positive signal is applied to the speed summing junction SP of the regulator 31. Because transistor 337 has turned on, however, a negative signal is applied to the speed summing junction SP of the regulator 31. This negative signal will force the driver to go into the braking mode. This braking action will continue until the speed of the drive has dropped to a level sufficiently low such that the output of tachometer 20, which is still positive, will no longer be capable of keeping transistor 335 on. When transistors 335, 336 and 337 turn off, the negative signal being applied to the speed summing junction SP will disappear. Also, the negative signal being applied to the noninverting input of operating amplifier 332 will disappear. However, as previously mentioned, the tachometer signal will still be positive. This positive signal now drives operational amplifier 332 into positive saturation, and a positive signal is applied to the speed summing junction SP of the regulator 31 telling the drive to go into the powering mode. This will cause counter-torqueing to occur through the zero speed condition and into quandrant 1 operation, as Figure 3 shows. Simultaneously, transistor 339 will turn on and shunt the tachometer signal which had been applied to transistor 335. This guarantees that, even if a momentary rollback occurs, this rollback will not cause the drive to go back into the braking mode.

Now an analogous situation will be analyzed for the opposite direction of operation. Assume that the drive has been going at full speed in the raise direction and that the operator plugs to the lowering direction. When this occurs contact LRSA will close. The polarity of the tachometer will remain negative, however. This negative signal is applied simultaneously to the inverting input of operation amplifier 332 and to the base of transistor 338. Again, however, due to the integration in the operational amplifier, transistor 338 will operate first. The turn on of transistor 338 will turn on transistor 337 and again apply a negative signal to the noninverting input of operational amplifier 332. This signal is sufficiently large to negate the negative signal being applied to the inverting input to the operational amplifier 332 and, consequently, the operational amplifier 332 will remain in negative saturation. As before, transistor 337 will turn on and apply a negative signal to the speed summing junction SP of the regulator 31 causing the drive to go into the braking mode. This will continue until the speed drops to a level which is sufficiently low such that transistor 338 drops out of conduction. When this occurs transistor 337 will also drop out, and the negative signal calling for braking will no longer be applied to the speed summing junction SP of the regulator 31. The negative signal being applied to the noninverting input of operational amplifier 332 will also disappear, and the negative signal being applied to the inverting input of operational amplifier 332 will drive operation amplifier 332 into positive saturation. This applies a positive signal to the summing junction SP of the regulator 31 causing the drive to go into a counter-torque powering mode and physically reverses the direction of rotation of motor 10. Simultaneously, this positive signal is also applied to the base of transistor 338 insuring that any rollback which occurs will not again retrigger the braking logic.

Referring now to FIGS. 5 and 6, a description will now be given of the firing pulse generators FPG1 and FPG2, which basically are very similar. In both cases firing circuits FC1 and FC3 operate off of the same control signal, while firing circuit FC2 operates singly. Also, in both cases phase synchronization and the power supply source is provided by three transformers hereinafter described. The principle difference lies in that the two firing pulse generators FPG1 and FPG2 have a difference in the phasing of the synchronization applied to their firing circuits. In both cases the firing pulse generators FPG1 and FPG2 can be considered to consist of three basic sections; namely, a first section comprised of the three transformers which bring power and synchronization signals into the firing pulse generator drawers; a second section comprising the firing circuits themselves designated FC1, FC2 and FC3; and a third section comprising the pulse amplifier sections designated PA1, PA2, PA3, PA4, PA5 and PA6.

Each of the sections has basically the same internal circuitry, and therefore only firing pulse generator FPG1 will be described. Power synchronization signals are brought in through the transformers whose primaries are designated 401, 402 and 403. The multiple secondaries of these transformers which are designated 404, 405 and 406 provide a triple function for the firing pulse generator FPG1. The first function is to apply power to the firing circuits FC1, FC2 and FC3. The second function is to provide phase synchronization to the firing circuits FC1, FC2 and FC3. The third function is to provide power to the pulse amplifiers PA1 through PA6. The power is applied to the firing circuits FC1 through FC3 by means of a three-phase center-tapped transformer configuration. No isolation is provided for the three power supplies, and all three firing circuits FC1, FC2 and FC3 work off of the same power supply. However, such is not the case for the pulse amplifiers PA1 through PA6. Each of the pulse amplifiers PA1 through PA6 operates on an isolated DC power supply whereby the isolation is provided by the respective secondaries designated 404, 405 and 406. This isolation is needed due to the fact that the pulse amplifiers PA1 through PA6 are directly coupled to the SCR gates which obviously have to operate at different potentials.

Since basically the internal circuitry of FC1, FC2 and FC3 are all the same, only FC1 will be described. Th synchronization signal comes into the firing circuit FC1 from two points 407 and 408 located on the secondary of transformer 404. It will be noted that these two circuits designated 407 and 408 provide signals which are 180° out of phase due to the fact that they originate on opposite sides of the center tap of the secondary of the transformer 404. These two out-of-phase signals are applied to transistors 409 and 410 and provide the basic synchronization signal into FC1.

Turning momentarily to a description of the incoming signal which acts as the phase magnitude or phase displacement control signal into firing circuit FC1, the common line for this firing circuit is designated as 411 and the control phase displacement signal line is designated 412. The presence of a signal between lines 411 and 412 is applied simultaneously to transistors 413 and 414. Transistor 413 acts as a current source which will vary in magnitude depending upon the magnitude of the signal applied at line 412. Transistor 414 serves only as an enabling circuit to provide power to the emitter of transistor 415. The basic circuit for determining the phase angle of firing is what is commonly referred to as a ramp and pedestal circuit. The ramp is built up across capacitor 416 by a steady current which is generated by transistor 415. The pedestal which is variable is developed across resistor 417 and varies with the current being developed by transistor 413. Thus, the total circuit action is such that the presence of any signal at line 412 will turn on transistor 414 and begin to generate a ramp on capacitor 416 through transistor 415 while simultaneously the signal at line 412 will generate a current through transistor 413 developing a pedestal across resistor 417. The summation of the ramp plus pedestal voltages are applied to the base of transistor 418. Transistor 418 is biased off by network 419 which provides a positive voltage at its emitter. When the voltage across the ramp and pedestal becomes sufficient to turn transistor 418 on, transistor 420 will also turn on, and a gate signal is thus applied to SCRs 421 and 422. However, only one or the other of these SCRs can fire. This is due to the fact that the phase synchronization transistors 409 and 410 will always have one or the other of their collectors at a low potential. Note that the collectors of these transistors are connected into the anode circuits of SCRs 421 and 422. Thus, if transistor 409 is on and transistor 410 is off, SCR 421 may fire by SCR 422 cannot fire. Likewise, if transistor 410 is on and transistor 409 is off, SCR 422 may fire by SCR 421 may not fire. When SCR 421 fires transistor 423 turns on. This, in turn, applies a large current pulse to pulse transformer 424. This pulse, in turn, is applied to the input of pulse amplifier PA2. On the other hand, when SCR 422 fires this turns on transistor 425. This applies a current pulse to transformer 426 which then, it turn, applies a pulse to pulse amplifier PA1. It can therefore be seen that the total function of the firing circuit FC1 is to apply a phase shifting pulse to pulse amplifiers PA1 and PA2 which are 180° out of phase. Similarly, FC2 applies a phase shifting pulse to PA3 and PA4, and FC3 applies a phase shifting pulse to PA5 and PA6. Due to the 120° phase relationship between the synchronization signals from the respective transformer secondaries 404, 405 and 406, as would be expected, the pulses being applied to pulse amplifiers PA1 through PA6 also vary in phase by 120°.

It is the function of the pulse amplifiers to amplify the small pulse generated by the pulse transformers into a signal which is sufficiently large to easily gate the power SCRs. Only pulse amplifier PA1 will be described since all other pulse amplifiers are similar. Let it be assumed that a pulse has just arrived from transformer 426 into the input of pulse amplifier PA1. This pulse will turn on transistor 427 which, in turn, will turn on transistor 428. Note that network 429 couples the turn on of transistor 428 back into the base of transistor 427 as a positive feedback. This will widen the pulse being applied from transformer 426. However, it is not a continuous positive feedback since the capacitor in network 429 will eventually fully charge and not allow any further current into the base of transistor 427. When transistor 428 turns on, a current flows through the network 430 into the gate of SCR 4A, gating this device. Once the capacitor in network 429 has become fully charged, transistor 427 will turn off; likewise transistor 428 will turn off, and network 429 will discharge such that it is reset for the next pulse. Pulse amplfiers PA2 through PA6 operate in a similar fashion.

The basic difference between the above description of firing pulse generator FPG1 and a description of firing pulse generator FPG2 is in the synchronization which is applied from the three input transformers and a slight difference in the way the pulse transformer outputs of firing circuit FC2 are coupled to the pulse amplifiers. A full description is not hereinafter made, but it should be noted that the reason for this difference in phase synchronization and in the coupling of the output of firing circuit FC2 is due to the fact that the output of firing circuit FC2 in firing pulse generator FPG2 is used to control the DC barking mode, whereas the outputs of firing circuits FC1, FC2 and FC3 in firing pulse generator FPG1 and also the outputs of firing circuits FC1 and FC3 in firing pulse generator FPG2 are used to control AC powering modes.

Although the described embodiment is with respect to a wound rotor motor, any induction type AC motor (squirrel cage, double squirrel cage, multi-speed, etc.) could be controlled by the non-emergency DC braking method described. Only those sections which relate to emergency DC braking are limited to the use of a wound rotor motor.

We claim:

1. A system comprising:
a source of alternating current;
a hoist motor energizable from said source to hoist and lower a suspended load;
said motor comprising a stator winding energizable from said source and a rotor winding;
a brake operable when said motor is deenergized to prevent rotation of said motor and to maintain said load suspended;
control means operable when said motor exceeds a predetermined motor speed to change the applied power of the alternating current supplied to said motor from said source to produce a flow of direct current in said motor and effect direct current braking of said motor, said control means including a controlled rectifier means to smooth said flow of direct current;
first means responsive to rotation of said motor to provide an electric signal;
second means for directing said signal to said stator winding when said motor is deenergized and in the event said brake fails to maintain said load stationary to initiate a magnetic field for interaction with said rotor winding and thereby produce current flow in said rotor winding;
and third means for directing said current flow from said rotor winding to said stator winding to effect direct current braking of said motor and thereby control the speed of descent of said suspended load.

2. In combination:
a source of polyphase alternating current;
a polyphase alternating current reversible wound rotor motor having a stator winding and a rotor winding;
speed sensing means for said motor;

an electromechanical brake for said motor;

and control means for operating said motor in forward and reverse directions at predetermined speeds and for braking said motor, said means comprising:

first means for connecting and disconnecting said stator winding and said source of alternating current and for operating said brake;

second means for reversing the phase sequence of said polyphase alternating current to said stator winding to reverse said motor;

third means responsive to said speed sensing means for changing the applied power of said polyphase alternating current to said stator winding to produce a flow of direct current to said stator winding to effect direct current braking of said motor speed exceeds a predetermined speed, said third means including a controllable rectifier connected across said stator winding; and fourth means to effect emergency direct current braking in the event of a failure of the supply of alternating current to said motor comprising first rectifier bridge means connectable in circuit with said rotor and stator windings to provide a flow a direct current therethrough, said fourth means further comprising a second rectifier bridge means to rectify a signal from said speed sensing means to initiate said flow.

3. In combination:

a source of polyphase alternating current;

a polyphase alternating current reversible wound rotor motor having a primary stator winding and a secondary rotor winding;

speed sensing means for said motor for providing a speed feedback signal;

an electromechanical brake for said motor;

and control means for operating said motor in forward and reverse directions at predetermined speeds and for braking said motor, said means comprising:

first selectively operable control means for connecting and disconnecting said stator winding and said source of alternating current and for providing a speed reference signal for operating said motor at a predetermined speed and for operating said brake;

second selectively operable control means for reversing the phase sequence of said polyphase alternating current to said stator winding to reverse said motor;

third means responsive to said speed reference signal and to said speed feedback signal from said speed sensing means for changing the applied power of said polyphase alternating current to said stator winding to produce a flow of direct current to said stator winding to effect direct current braking of said motor when motor speed exceeds a predetermined speed, said third means including a controllable rectifier connected across said stator winding to smooth said flow of direct current; and fourth means to effect emergency direct current braking in the event of a failure of the supply of alternating current to said motor and said electromechanical brake comprising first rectifier bridge means connectable in circuit with said rotor and stator windings to provide a flow of direct current therethrough, said fourth means further comprising a second rectifier bridge means to rectify a signal from said speed sensing means to initiate said flow.

4. In a hoist:

an alternating current, three-phase variable speed reversible wound rotor motor for hoisting and lowering a load, said motor comprising primary stator windings and secondary rotor windings;

an electromagnetic brake for said motor;

a tachometer generator responsive to rotation of said motor to provide a speed feedback signal;

operator-actuated control means for controlling the direction and speed of rotation of said motor and for operating said electromagnetic brake when said motor is deenergized, said operator-actuated control means providing a reference signal for determining motor speed;

controlled rectifiers connected to said primary stator windings to control motor direction and motor speed and to effect direct current braking of said motor;

control means for operating said controlled rectifiers in response to an earlier signal resulting from comparison of said speed reference signal and said speed feedback signal, said control means being further responsive to said speed reference signal and said speed feedback signal to execute appropriate gating of said controlled rectifiers to apply direct current to said primary stator winding to effect direct current braking;

a free wheeling controlled rectifier connected across said primary stator winding of said motor to smooth the direct current flow in said primary stator winding; and emergency direct current braking means operable in the event of failure of said electromagnetic brake while said motor is deenergized and supporting a load, said emergency braking means comprising a first rectifier for applying a rectified feedback signal from said tachometer to induce a magnetic field in said primary stator windings, and second rectifier means for connection between said rotor windings and said stator windings to provide a path for direct current induced in said motor windings to effect direct current braking of said motor and to slow the descent of said load, and switch means operable in the event of failure of said electromagnetic brake while said motor is deenergized to connect said second rectifier means for operation.

5. A system comprising: a source of alternating current, a motor energizable from said source and comprising a stator winding, and control means including controlled rectifiers and speed sensing means for sensing the speed of said motor, said controlled rectifiers operating to fire in a predetermined sequence so as to apply alternating current to said stator winding to run said motor, said speed sensing means operable when said motor exceeds a predetermined motor speed to change the firing sequence of said controlled rectifiers so as to produce a flow of full-wave rectified direct current in said motor and effect direct current braking of said motor, said control means including a controlled rectifier means connected across said stator winding and acting as a free-wheeling rectifier means to smooth said flow of full-wave rectified direct current.

6. A system comprising: a source of polyphase alternating current, a polyphase motor energizable from said source and comprising a polyphase stator winding, and control means including controlled rectifiers and speed sensing means for sensing the speed of said motor, said controlled rectifiers operating to fire in a predetermined sequence so as to apply alternating current to said stator winding to run said motor, said speed sensing means operable when said motor exceeds a predetermined speed to change the firing sequence of said controlled rectifiers so as to produce a flow of full-wave rectified direct current in said stator winding and effect direct current braking of said motor, said control means including controlled rectifier means connected across said stator winding and acting as a free-wheeling rectifier means to smooth said flow of full-wave rectified direct current.

7. A system according to claim 6 wherein said rectifier means comprises a controlled rectifier and wherein said speed sensing means operates to render said controlled rectifier conductive when said motor exceeds said predetermined speed.

8. A system comprising: a source of alternating current, a reversible motor energizable from said source and comprising a stator winding, and control means including controlled rectifiers, direction control means, and speed sensing means for sensing the speed of said motor, said direction control means operating said controlled rectifiers to fire in predetermined sequences so as to apply alternating current to said stator winding to run said motor in either direction at predetermined speeds, said speed sensing means operating to control the direction of rotation and speed of said motor, and operable when said motor exceeds a predetermined motor speed to change the firing sequence of said controlled rectifiers so as to produce a flow of full-wave rectified direct current in said motor and effect direct current braking of said motor, said control means including controlled rectifier means connected across said stator winding and acting as a free-wheeling rectifier means to smooth said flow of full-wave rectified direct current.

9. A system comprising: a source of polyphase alternating current, a polyphase reversible motor energizable from said source and comprising a polyphase stator winding, and control means including controlled rectifiers, direction control means, and speed sensing means for sensing the speed of said motor, said direction control means operable for reversing the phase sequence of current supplied to said stator winding from said source to reverse said motor and for changing the applied voltage supplied to said stator winding from said source to control the speed of said motor, said speed sensing means of said control means being operable when said motor exceeds a predetermined speed to change the firing sequence of said controlled rectifiers so as to produce a flow of full-wave rectified direct current in said stator winding and effect direct current braking of said motor, said control means including controlled rectifier means connected across said stator winding and acting as a free-wheeling rectifier means to smooth said flow of full-wave rectified direct current.

10. A system according to claim 9 wherein said speed sensing means of said control means operates to render said controlled rectifier means conductive when said motor exceeds said predetermined speed.

11. In a hoist:
a source of electric power;
a motor energizable from said source to hoist and lower a suspended load;
said motor comprising a stator winding energizable from said source and a rotor winding;

a brake operable when said motor is deenergized to prevent rotation of said motor and to maintain said load suspended;
first means responsive to rotation of said motor to provide an electric signal;
second means for directing said signal to said stator winding when said motor is deenergized and in the event said brake fails to maintain said load stationary to initiate a magnetic field for interaction with said rotor winding and thereby produce current flow in said rotor winding;
and third means for directing said current flow from said rotor winding to said stator winding to effect direct current braking of said motor and thereby control the speed of descent of said suspended load.

12. A hoist according to claim 11 wherein said first means comprises a generator.

13. A hoist according to claim 11 wherein said first means comprises a direct current tachometer generator, wherein said second means comprises rectifier means for said electric signal, and wherein said third means comprises rectifying means for rectifying current flow from said rotor winding.

14. In a hoist:
a source of alternating current electric power;
a motor energizable from said source to hoist and lower a suspended load;
said motor comprising a stator winding energizable from said source and a rotor winding;
a brake operable when said motor is deenergized to prevent rotation of said motor and to maintain said load suspended;
first means responsive to rotation of said motor to provide a direct current signal;
second means for rectifying said direct current signal so that polarity is constant and for directing said rectified signal to said stator winding when said motor is deenergized and in the event said brake fails to maintain said load stationary to initiate a magnetic field for interaction with said rotor winding and thereby produce an alternating current in said rotor winding;
and third means for rectifying said alternating current and for directing said rectified current from said rotor winding to said stator winding to effect direct current braking of said motor and thereby control the speed of descent of said suspended laod.

15. A hoist according to claim 14 wherein said first means comprises a direct current tachometer generator, wherein said second means comprises rectifier means for said electric signal, and wherein said third means comprises rectifying means for rectifying current flow from said rotor winding.

16. A hoist according to claim 15 wherein said second means comprises switch means for connecting and disconnecting said tachometer generator and said stator winding and wherein said third means comprises switch means for connecting and disconnecting said rotor winding and said stator winding.

17. In a hoist:
a source of alternating current electric power;
a motor energizable from said source to hoist and lower a suspended load;
said motor comprising a stator winding energizable from said source and a rotor winding;

and electromechanical brake energizable from said source and operable when deenergized and when said motor is deenergized to prevent rotation of said motor and to maintain said load suspended;

means including a tachometer generator responsive to rotation of said motor to provide a direct current electric signal;

first rectifying means for rectifying said direct current signal to a constant polarity signal;

switch means for connecting said first rectifying means to said stator winding when said motor is deenergized and in the event said brake fails to maintain said load stationary to initiate a magnetic field for interaction with said rotor winding and thereby produce alternating current flow from said rotor winding;

second rectifying means for rectifying said alternating current flow from said rotor winding;

and switch means for connecting said rotor winding to said stator winding to effect direct current braking of said motor and thereby control the speed of descent of said suspended load.

18. In combination:

a source of alternating current;

an alternating current wound rotor motor having a stator winding energizable from said source and a rotor winding;

control resistance means connected to said rotor winding;

an electromechanical brake energizable from said source;

a direct current tachometer having a pair of output terminals and driven by said motor;

control means for connecting and disconnecting said stator winding and said electromechanical brake to and from said source;

and braking means operable in the event of failure of said electromechanical brake to effect direct current braking of said motor, and braking means comprising:

first rectifier means having input terminals connected to the output terminals of said tachometer;

second rectifier means having input and output terminals;

first switch means responsive to operation of said control means to disconnect said motor from said source to connect the output terminals of said first rectifier means and the input terminals of said second rectifier across said stator winding of said motor;

and second switch means responsive to operation of said control means to connect the output terminals of said second rectifier means across the rotor winding of said motor.

19. In combination:

a source of three-phase alternating current;

a three-phase alternating current wound rotor motor having a stator winding and a rotor winding;

a direct current tachometer for said motor and having two output terminals;

an electromechanical brake energizable to prevent rotation of said motor when said motor is deenergized;

control means for energizing and deenergizing said electromechanical brake for said motor, said control means comprising:

means to effect emergency direct current braking in the event of a failure of the supply of alternating current to said motor and to said electromechanical brake comprising rectifier bridge means connectable in circuit with said rotor and stator windings to provide a flow of direct current therethrough and rectifier bridge means having input terminals connected to said output terminals of said tachometer to rectify a signal from said tachometer to initiate said flow.

* * * * *

UNITED STATES PATENT OFFICE
CERTIFICATE OF CORRECTION

Patent No. 4,030,007              Dated June 14, 1977

Inventor(s) Lester A. Price et al.

It is certified that error appears in the above-identified patent and that said Letters Patent are hereby corrected as shown below:

Column 23, line 16, after "motor" should read --when motor--.

Signed and Sealed this

Eighth Day of May 1979

[SEAL]

Attest:

RUTH C. MASON
Attesting Officer

DONALD W. BANNER
Commissioner of Patents and Trademarks